(12) United States Patent
Weiss et al.

(10) Patent No.: US 8,261,188 B2
(45) Date of Patent: *Sep. 4, 2012

(54) METHOD OF ASSOCIATING PROPERTIES OR FIELDS OF GRAPHICAL OBJECTS WITH EACH OTHER FOR EFFICIENT COMPOSITION OF DOCUMENTS

(75) Inventors: Mark A. Weiss, Rydal, PA (US); Daniel J. Freiman, Philadelphia, PA (US)

(73) Assignee: ColorQuick, L.L.C., Pennsauken, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/417,484

(22) Filed: Apr. 2, 2009

(65) Prior Publication Data

US 2009/0254816 A1    Oct. 8, 2009

Related U.S. Application Data

(60) Provisional application No. 61/041,846, filed on Apr. 2, 2008.

(51) Int. Cl.
G06F 17/00 (2006.01)
(52) U.S. Cl. .......... 715/255; 715/731; 715/769
(58) Field of Classification Search ............ 715/255, 715/731, 769
See application file for complete search history.

(56) References Cited

U.S. PATENT DOCUMENTS

| | | | |
|---|---|---|---|
| 5,615,326 A | 3/1997 | Orton et al. | |
| 5,822,587 A | 10/1998 | McDonald et al. | |
| 6,928,610 B2 | 8/2005 | Brintzenhofe et al. | |
| 7,089,203 B1 | 8/2006 | Crookshanks | |
| 7,194,743 B2 | 3/2007 | Hayton et al. | |
| 7,265,763 B2 | 9/2007 | Bossut et al. | |
| 7,370,274 B1 | 5/2008 | Stuple et al. | |
| 2006/0036950 A1 | 2/2006 | Himberger et al. | |
| 2006/0133670 A1 | 6/2006 | Barrus et al. | |
| 2007/0028165 A1 | 2/2007 | Cole | |

OTHER PUBLICATIONS

Designer, Adobe LiveCycle Designer 7.0 Copyright 2004, pp. 1-7.*
Network, Erack Network, Photoshop Tutorial, Copyright © 2003-2006, Archive.org: Feb. 8, 2007, pp. 1-4.
Bouton, Inside Adobe Photoshop 5, Copyright © 1998, pp. 1-9.
FileFormat, Adobe Photoshop File Format Summary, Copyright © 991-1995, downloaded from website: http://www.fileformat.info/format/psd/egff.htm; download date: Feb. 27, 2010, pp. 1-9.
Designer, Adobe Live Cycle Designer 7.0, 2004, 5 pages.

* cited by examiner

*Primary Examiner* — Andrey Belousov
(74) *Attorney, Agent, or Firm* — Panitch Schwarze Belisario & Nadel LLP

(57) ABSTRACT

A computer-implemented method is provided for preparing a document for editing. The document includes a first graphical object and at least one variable field or property in a second graphical object that is associated with a property of the first graphical object. The first graphical object has a plurality of properties. A user interface display screen is provided that allows a user to design a document that includes a plurality of graphical objects. Then, a document is created on the user interface display screen. A first graphical object and a second graphical object are added to the document. At least one variable field or property in the second graphical object is identified. The identified field or property in the second graphical object is associated with a property of the first graphical object. In this manner, a document is prepared for editing.

17 Claims, 29 Drawing Sheets

| | |
|---|---|
| Edit Data for this Image File | |
| Original File Name | OS45020.JPG |
| Headline | Sunflower |
| Alternate Headline | Big Yellow Flower |
| Description | Sunflower |
| Comments | This is a sunflower. |
| Main Text | What is usually called the flower is actually a head (formally composite flower) of numerous flowers (florets) crowded together. The outer flowers are the ray florets and can be yellow, maroon, orange, or other colors, and are sterile. The florets inside |
| Alternate Text | Sunflowers in the bud stage exhibit heliotropism. At sunrise, the faces of most sunflowers are turned towards the east. Over the course of the day, they move to track the sun from east to west, while at night they return to an eastward orientation. This |
| Pricing *(as a text description)* — Price 1 | 2.00 |
| Price 2 | 4.00 |
| Price 3 | |

Figure 5A

| | | |
|---|---|---|
| Disclaimer | Sunflowers not guaranteed to live forever. | |
| Item Number | 2 | |
| Manufacturing Number | 2 | |
| | Min Height (Inches) | Min Width (Inches) |
| Usage Constraints *(0 = no constraints)* | 0 | 0 |
| | Max Scale (%) | Min Transparency (%) |
| | 0 | 0 |
| User Field 1 | | |
| User Field 2 | | |
| Lock Proportions | ☒ No  ☐ Yes | |
| Disable Cropping | ☒ No  ☐ Yes | |

Save Changes

Edit Data for this Image File

| | |
|---|---|
| Original File Name | OS45020.JPG |
| Headline | Sunflower |
| Alternate Headline | Big Yellow Flower |
| Description | Sunflower |
| Comments | This is a sunflower. |
| Main Text | What is usually called the flower is actually a head (formally composite flower) of numerous flowers (florets) crowded together. The outer flowers are the ray florets and can be yellow, maroon, orange, or other colors, and are sterile. The florets inside |
| Alternate Text | Sunflowers in the bud stage exhibit heliotropism. At sunrise, the faces of most sunflowers are turned towards the east. Over the course of the day, they move to track the sun from east to west, while at night they return to an eastward orientation. This |
| List *(Linked List Asset Number)* | 43112 |
| Disclaimer | Sunflowers not guaranteed to live forever. |
| Item Number | 2 |
| Manufacturing Number | 2 |

Usage Constraints
*(0 = no constraints)*

| Min Height (Inches) | Min Width (Inches) |
|---|---|
| 0 | 0 |
| Max Scale (%) | Min Transparency (%) |
| 0 | 0 |

Figure 24

| Asset #43112 | | |
|---|---|---|
| Item | Description | Price |
| 1 | Little Sunflower | 2.50 |
| 2 | Standard Sunflower | 4.00 |
| 3 | Large Sunflower | 5.00 |
| 4 | Daisy | 3.00 |
| 5 | Pink Rose | 2.75 |

Figure 25

METHOD OF ASSOCIATING PROPERTIES OR FIELDS OF GRAPHICAL OBJECTS WITH EACH OTHER FOR EFFICIENT COMPOSITION OF DOCUMENTS

CROSS-REFERENCE TO RELATED APPLICATIONS

This application claims the benefit of U.S. Provisional Patent Application No. 61/041,846 filed Apr. 2, 2008.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

It is well-known to use graphical objects within an electronic document. The object may cause text and/or images to appear in the electronic document at a user-defined location. Such graphical objects may include variable fields or properties. It is desirable in certain situations to allow the variable fields or properties of such graphical objects to become associated with each other. The present invention fulfills such a need.

BRIEF SUMMARY OF THE INVENTION

In one preferred embodiment, a computer-implemented method is provided for preparing a document for editing. The document includes a first graphical object and at least one variable field or property in a second graphical object that is associated with a property of the first graphical object. The first graphical object has a plurality of properties. A user interface display screen is provided that allows a user to design a document that includes a plurality of graphical objects. Then, a document is created on the user interface display screen. A first graphical object and a second graphical object are added to the document. At least one variable field or property in the second graphical object is identified. The identified field or property in the second graphical object is associated with a property of the first graphical object. In this manner, a document is prepared for editing.

BRIEF DESCRIPTION OF THE DRAWINGS

The foregoing summary as well as the following detailed description of preferred embodiments of the invention, will be better understood when read in conjunction with the appended drawings. For the purpose of illustrating the invention, the drawings show presently preferred embodiments. However, the invention is not limited to the precise arrangements and instrumentalities shown. In the drawings:

FIGS. 1-26 are user interface display screens in accordance with preferred embodiments of the present invention.

DETAILED DESCRIPTION OF THE INVENTION

Certain terminology is used herein for convenience only and is not to be taken as a limitation on the present invention.

This patent application includes an Appendix having a file named appendix 10379-30U1.txt, created on Mar. 30, 2009, and having a size of 1,435,168 bytes. The Appendix is incorporated by reference into the present patent application. One preferred embodiment of the present invention is implemented via the source code in the Appendix. The Appendix is subject to the "Copyright Notice and Authorization" stated above.

The present invention is described in the context of a web-based commercial implementation called Improv™ marketed by Colorquick, L.L.C, Pennsauken, N.J. Improv is a document composition application.

Figure 1:
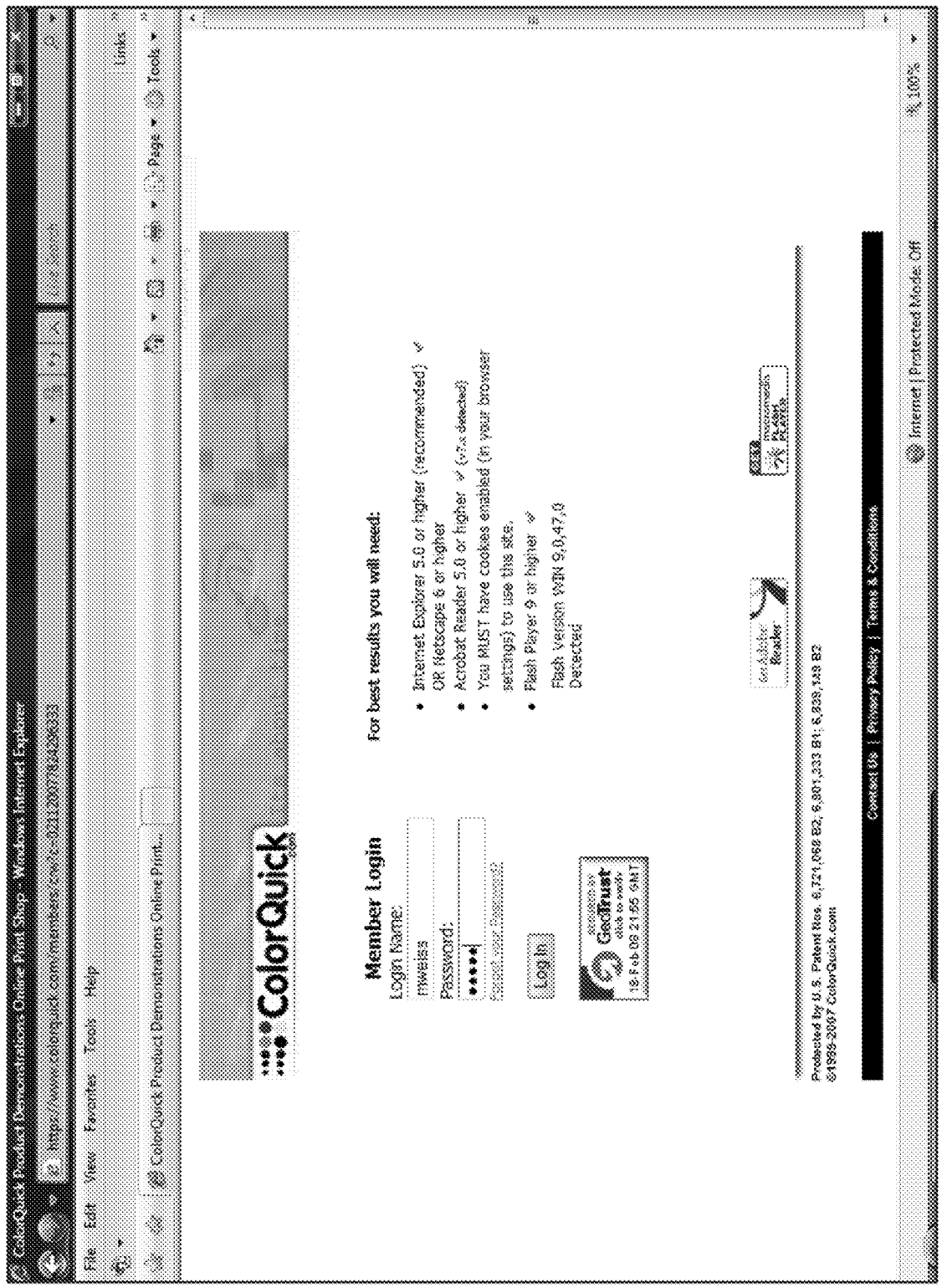

In FIG. 1, the user logs into the secure website.

FIGS. 2-5B show how to select and associate data with images in the digital asset library.

Figure 2:
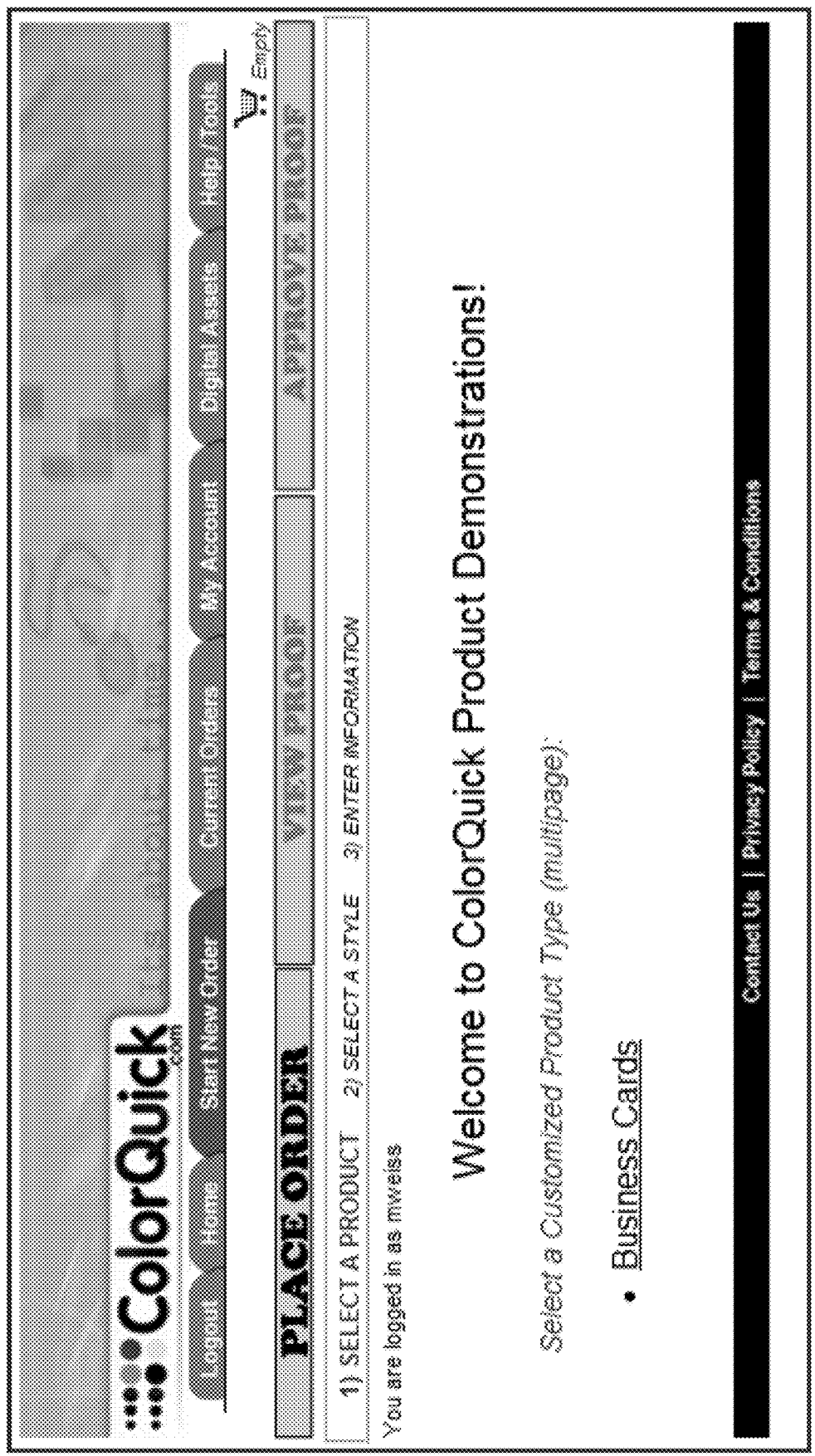
Figure 3:
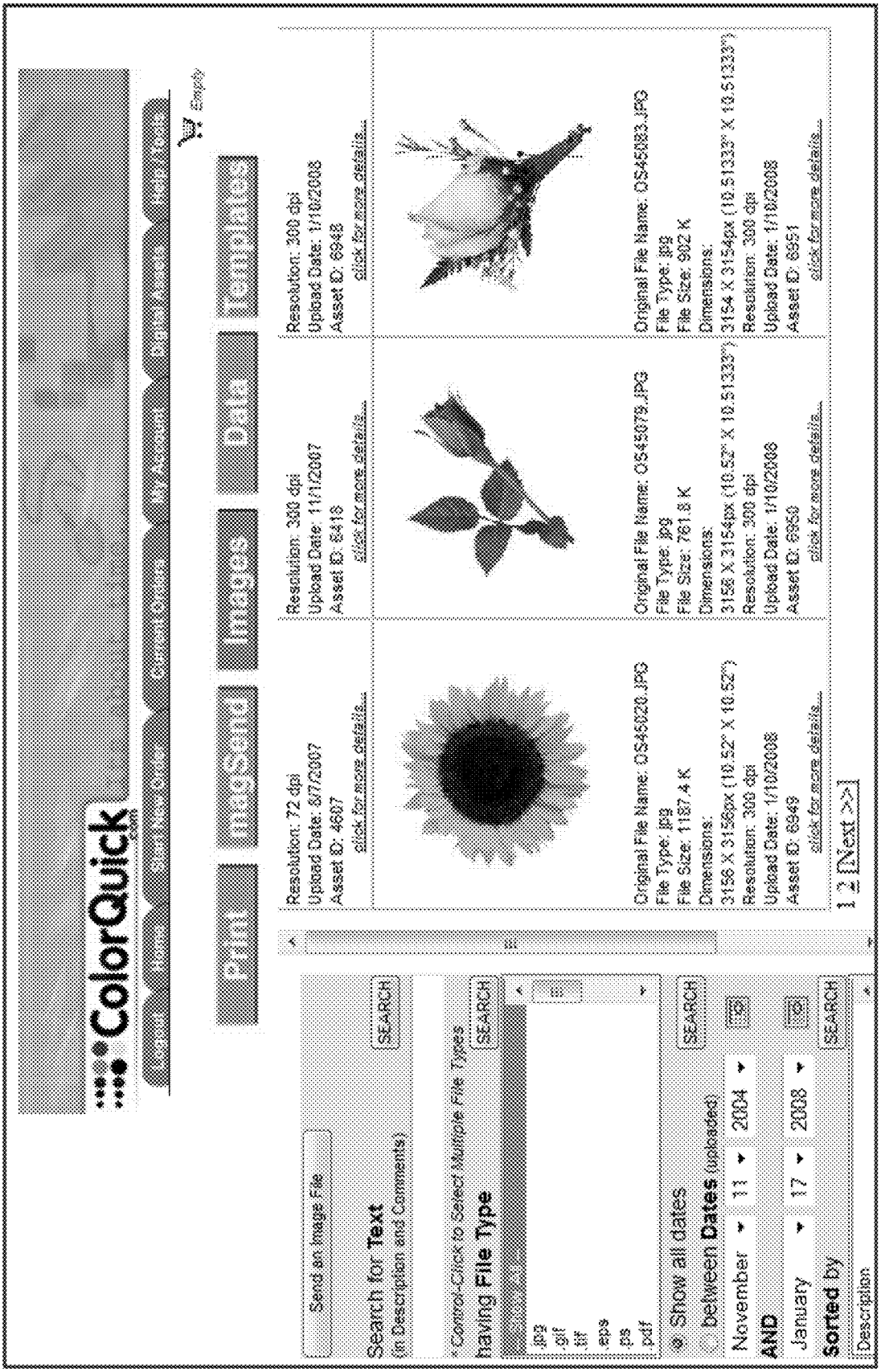
Figure 4:
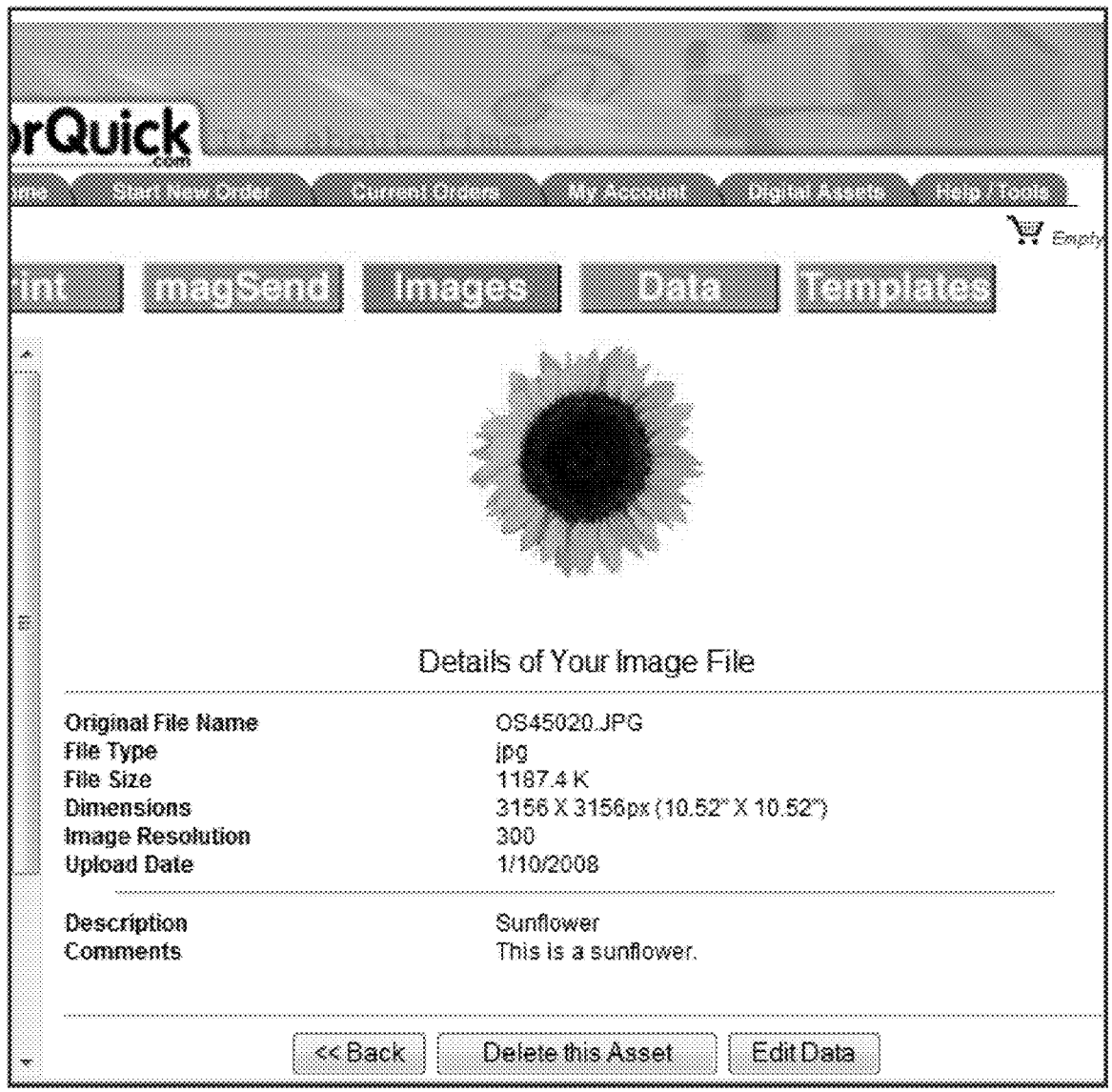

FIG. 2 shows the default navigation page after the user logs into the site. Clicking on the Digital Assets Tab in FIG. 2 moves the user into the Digital Asset Management portion of the site, as shown in FIG. 3. FIG. 3 shows how a user may browse their uploaded assets and view details of an asset by clicking on a link. In FIG. 3, the category being browsed is "Images." Navigation buttons (e.g., Print, magSend) can be used to browse specific categories of assets. FIG. 4 shows a user viewing the details of an asset. The asset shown in FIG. 4 is a picture of a sunflower. By clicking the "Edit Data" button in FIG. 4, the screen shown in FIGS. 5A and 5B appears. (FIG. 5A appended with picture 5B depicts a single webpage.) FIGS. 5A and 5B shows a screen that allows for editing of data associated with the asset.

The text entered in FIGS. 5A and 5B is put into different fields. Saving these values associates this text with the digital asset (here, a picture of the Sunflower) in specific fields. This process is repeated for any digital asset, in this case, a photograph that has associated text, pricing or other printable data.

FIGS. 6-17 show selecting and editing a pre-made template, and also show various relevant features of the template. Editing includes replacing images in the template and changing the associated data of an image that is being rendered in the composition.

Figure 6:
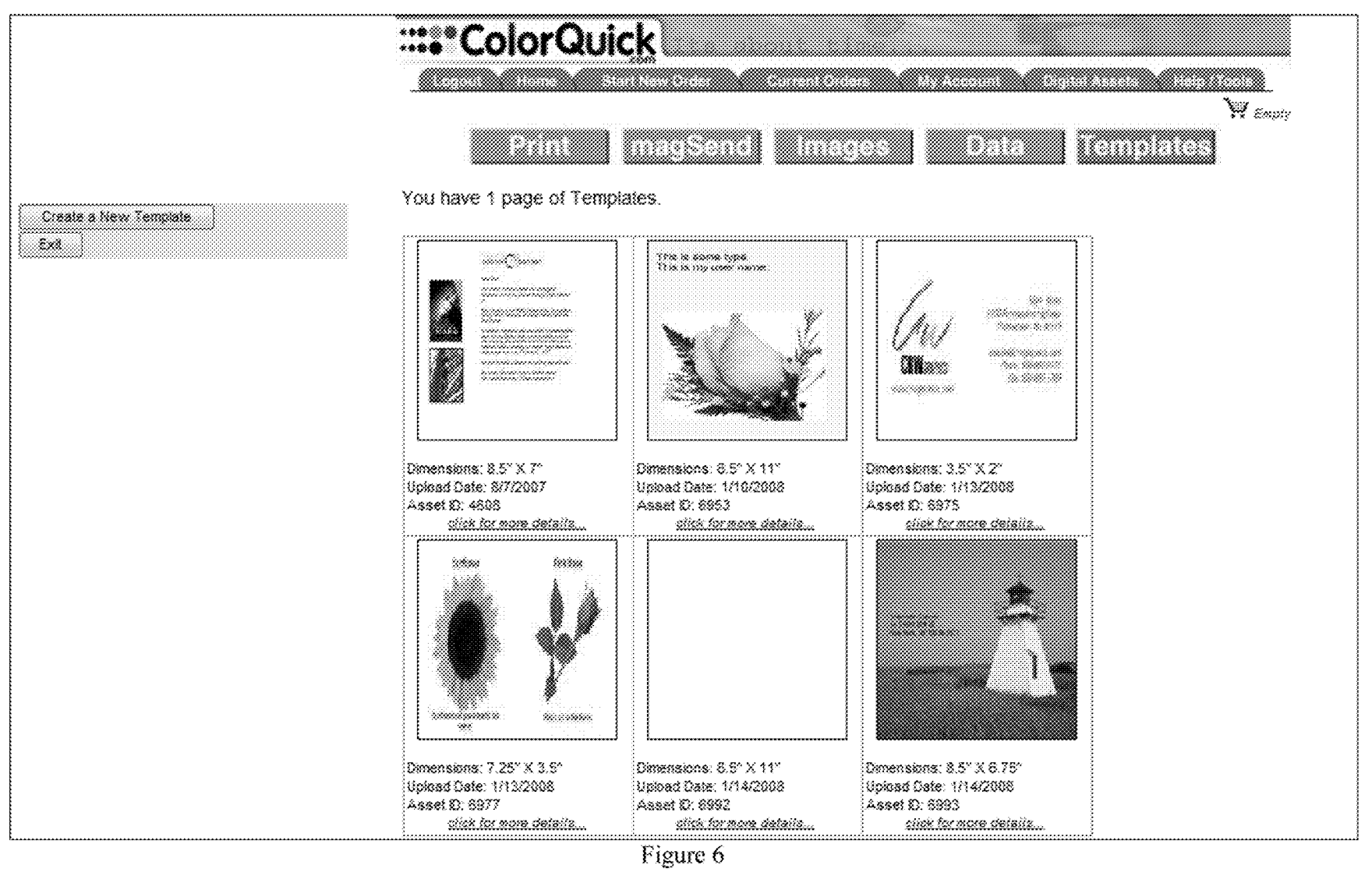
Figure 7:
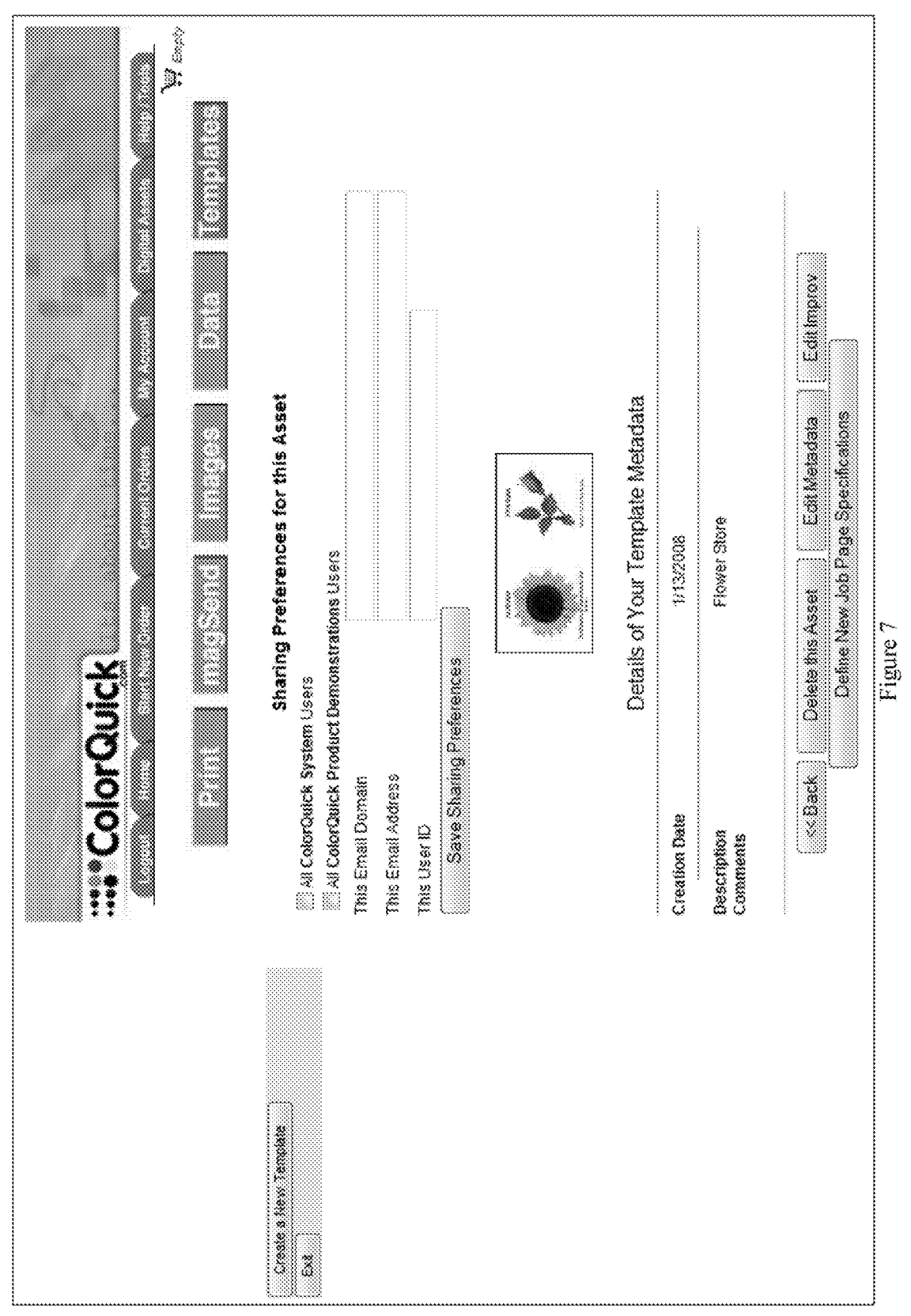
Figure 8:
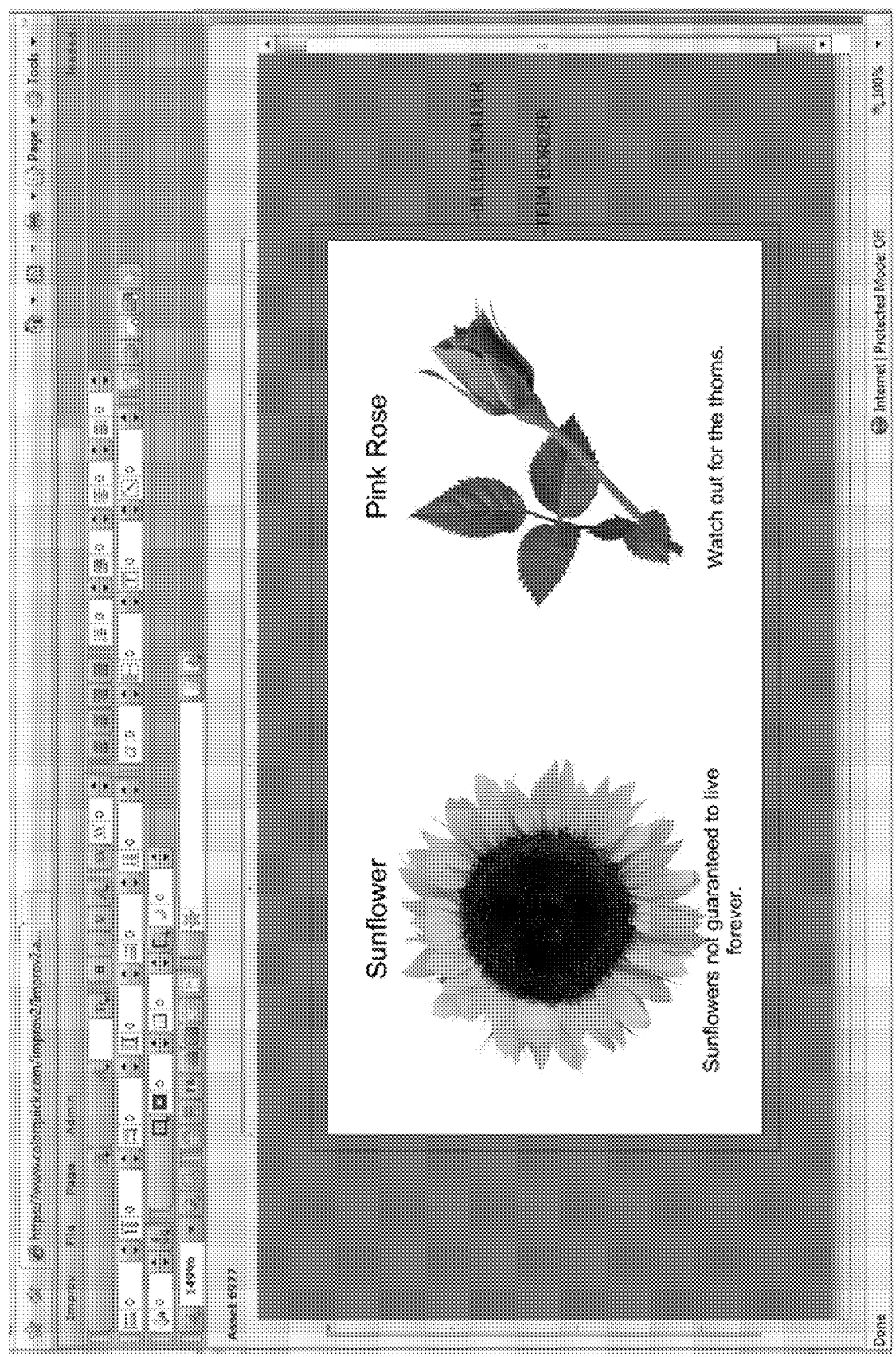

In FIG. 6, the user is browsing Template assets. FIG. 7 shows the details for a specific asset (the one in the bottom left corner of FIG. 6) and an "Edit Improv" button which allows the user to edit the currently viewed template. Clicking this button launches the Improv application (a document composition environment) and loads the document with the two flowers, as shown in FIG. 8.

Figure 9:
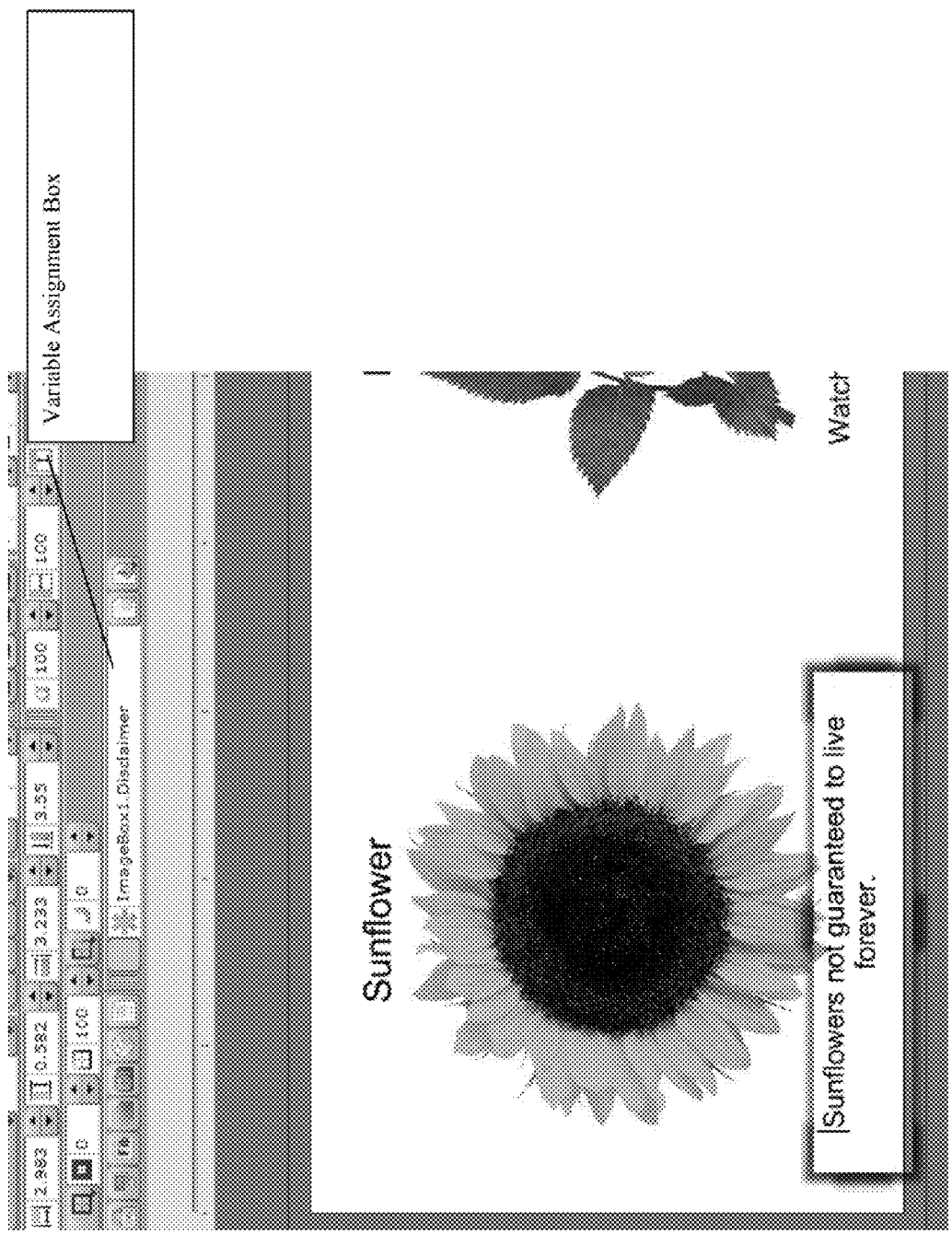

In FIG. 9, the user has selected text in the text box under the left flower image. The "variable assignment box" shows the variable that is associated with the selected text. In FIG. 9, the first index of the aforementioned text box is selected and this index is the beginning of a variable field associated with the property "ImageBox1.Disclaimer". The value of Imagebox1.Disclaimer is "Sunflowers not guaranteed to live forever." To summarize, the designer of this template has assigned the value of a variable field in the textbox to be set to data that is associated with the image that happens to be in ImageBox1. In this case, that image is a picture of a sunflower.

Figure 10:
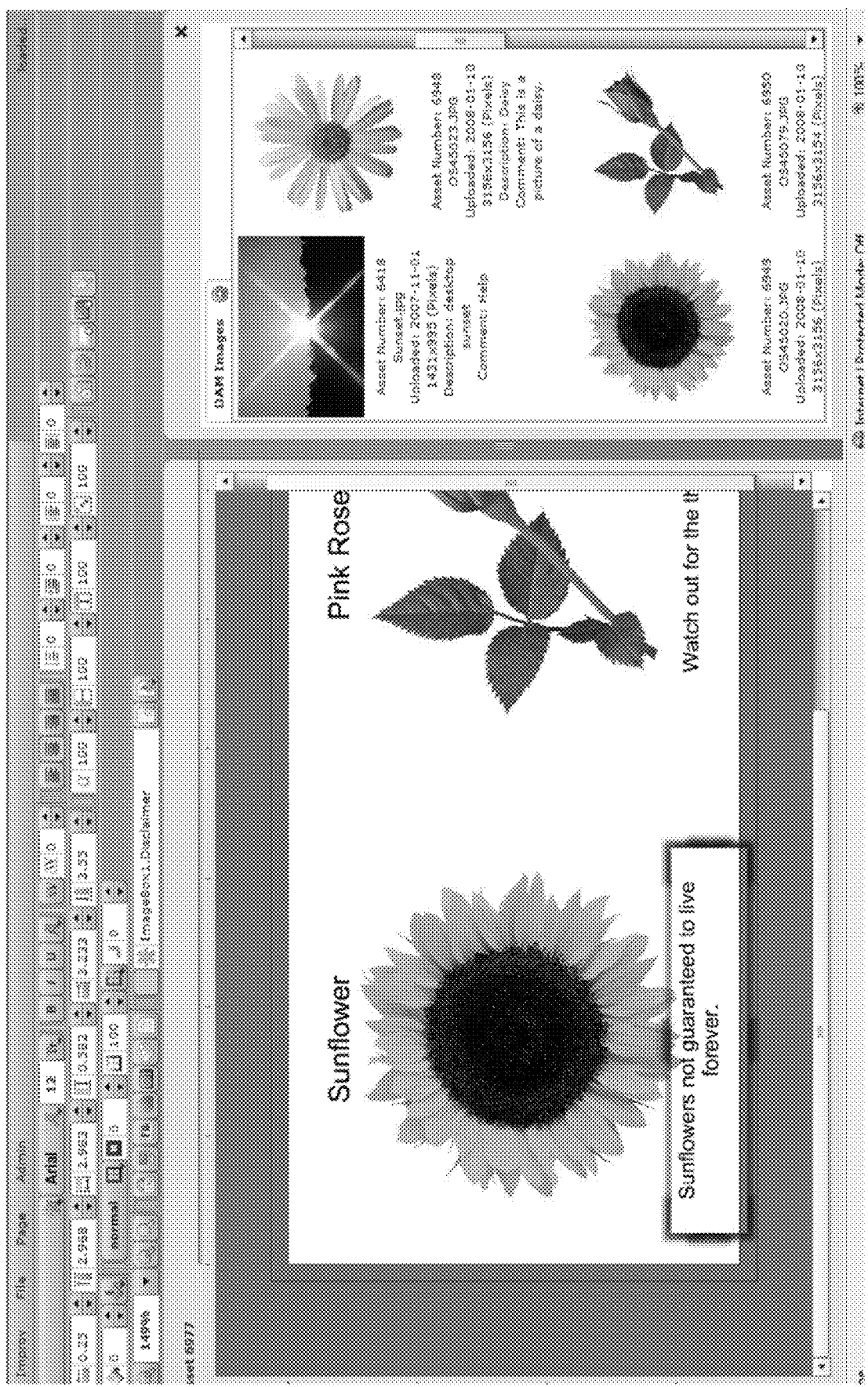
Figure 11A:
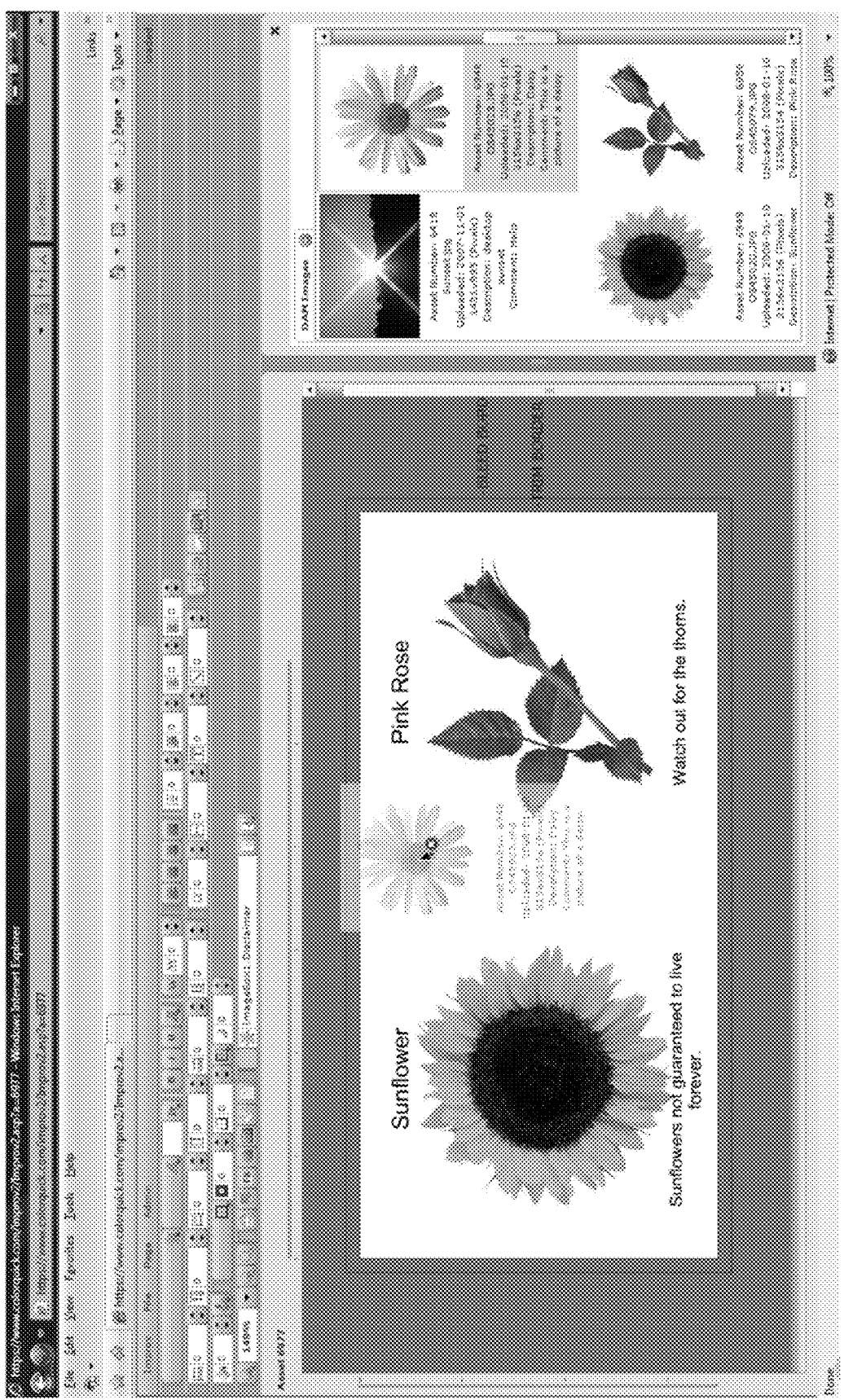
Figure 11B:
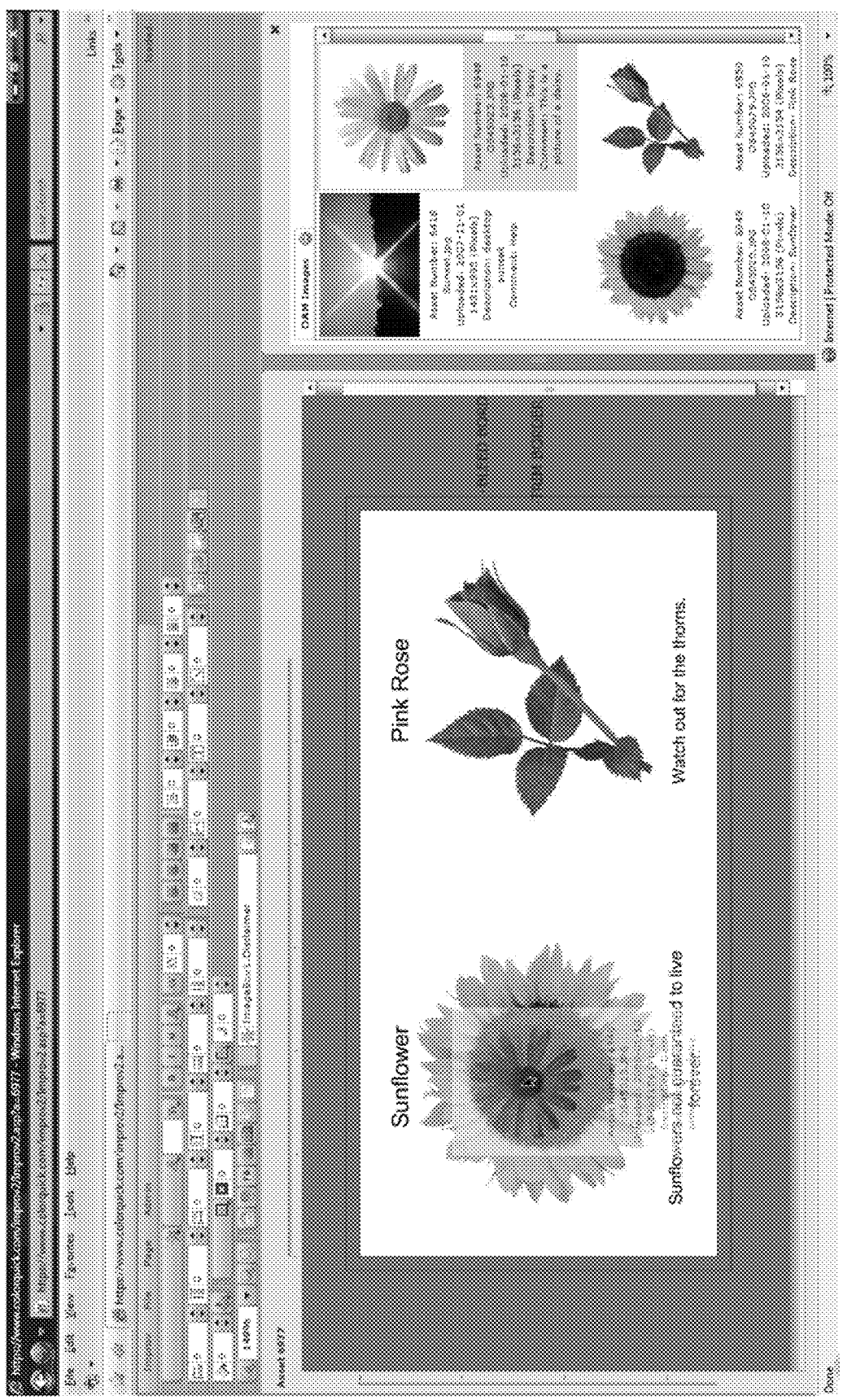

FIG. 10 shows the user browsing their images from their digital asset library in the panel to the right after the user has clicked the "Browse Digital Assets" button. FIGS. 11A and 11B show a sunflower being dragged onto the live page by the user and placed in (dropped onto) ImageBox1. In this manner, the graphical object is linked to the digital asset.

Figure 12:
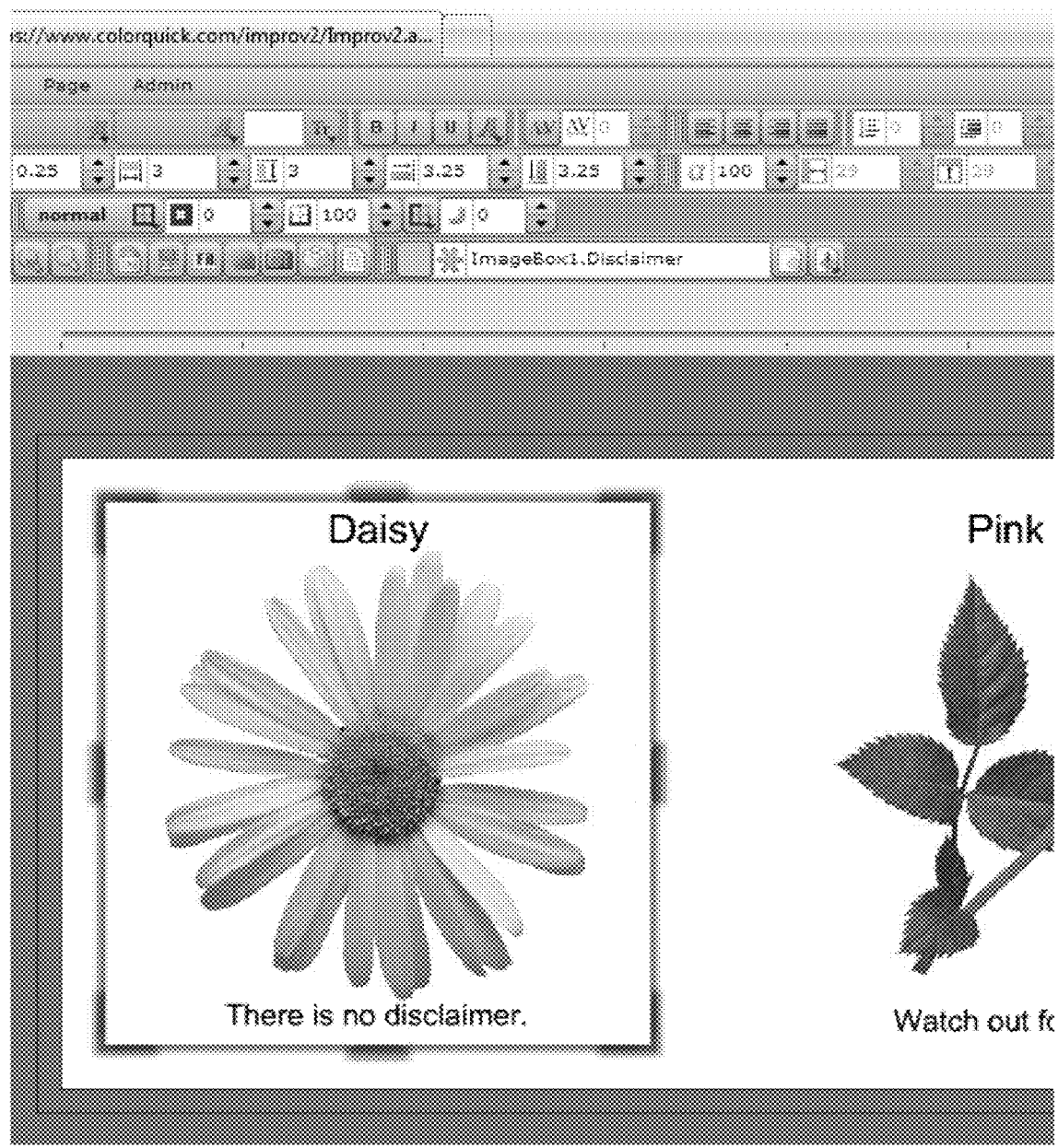
Figure 13:
Figure 14:
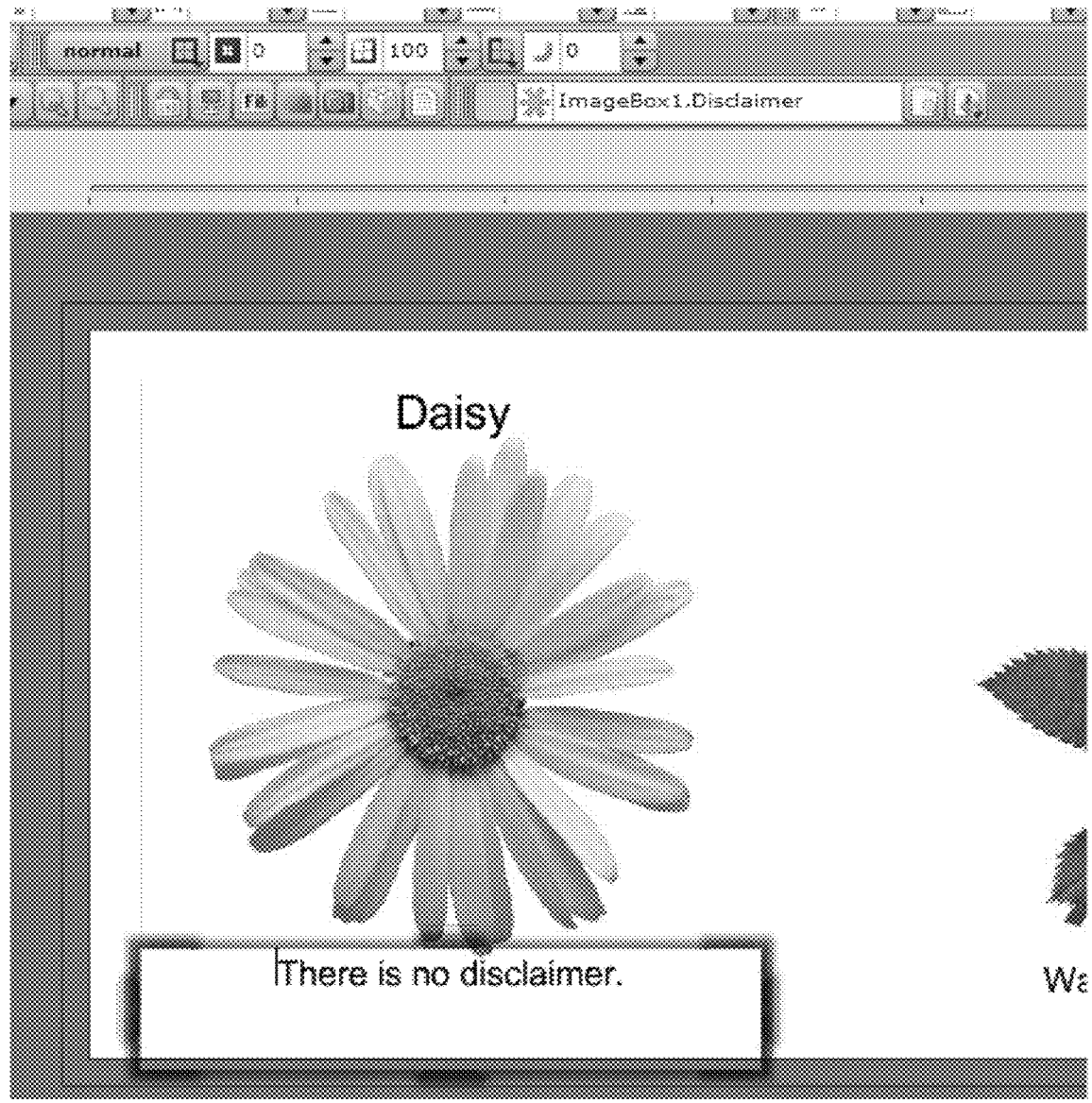

FIG. 12 shows the new asset placed in ImageBox1. The values of the variable fields in the text boxes above and below the Daisy image asset have been replaced automatically with values associated with the Daisy image asset. The only immediate user action which caused the values of these text boxes to be updated was dragging the image into an Image Box, thus creating a new version of the document. In FIGS. 13 and 14, the two respective text boxes have been highlighted to show the text associated with the Fields "Headline" and "Disclaimer" of ImageBox1.

Figure 15:
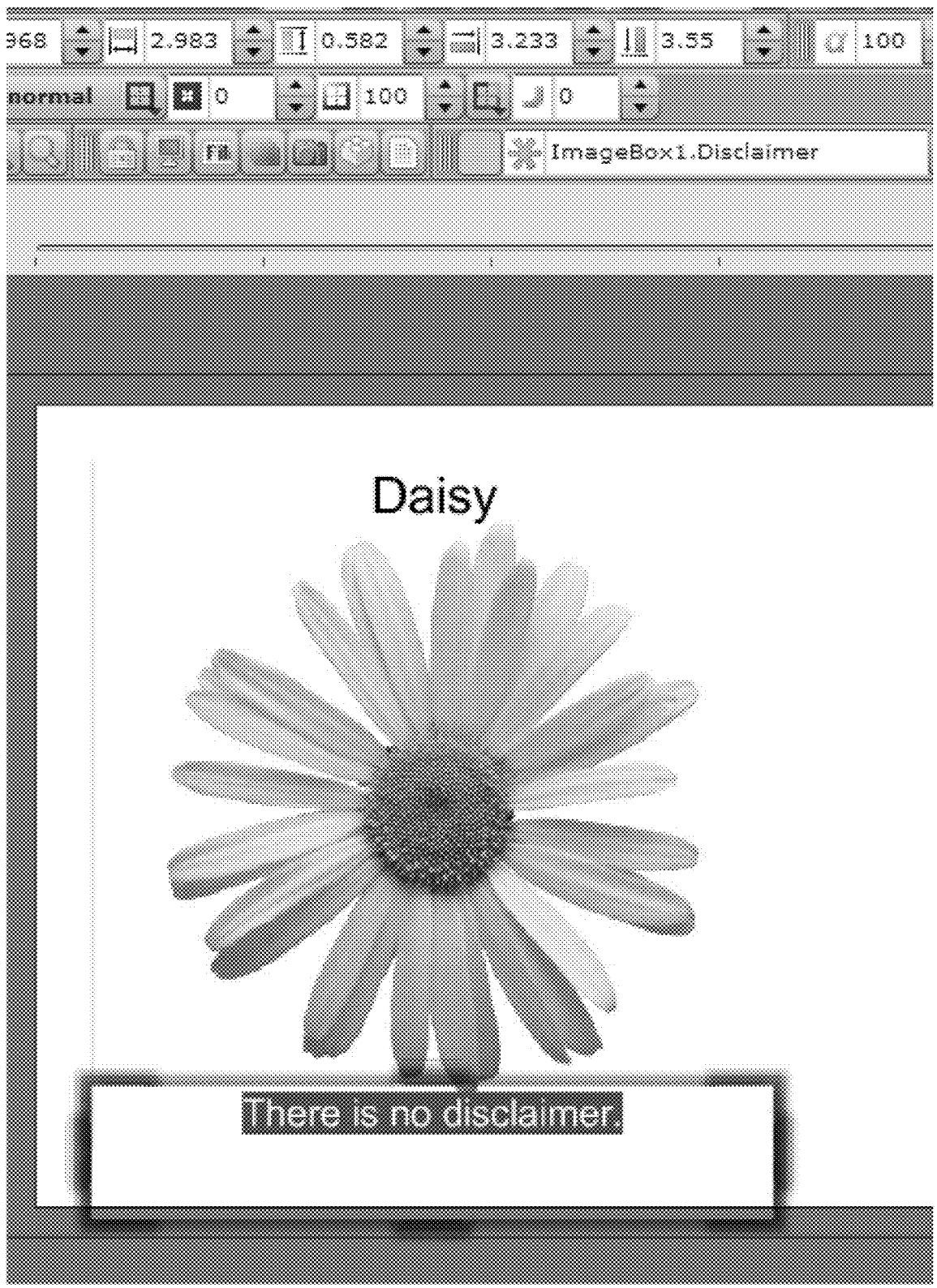
Figure 16:
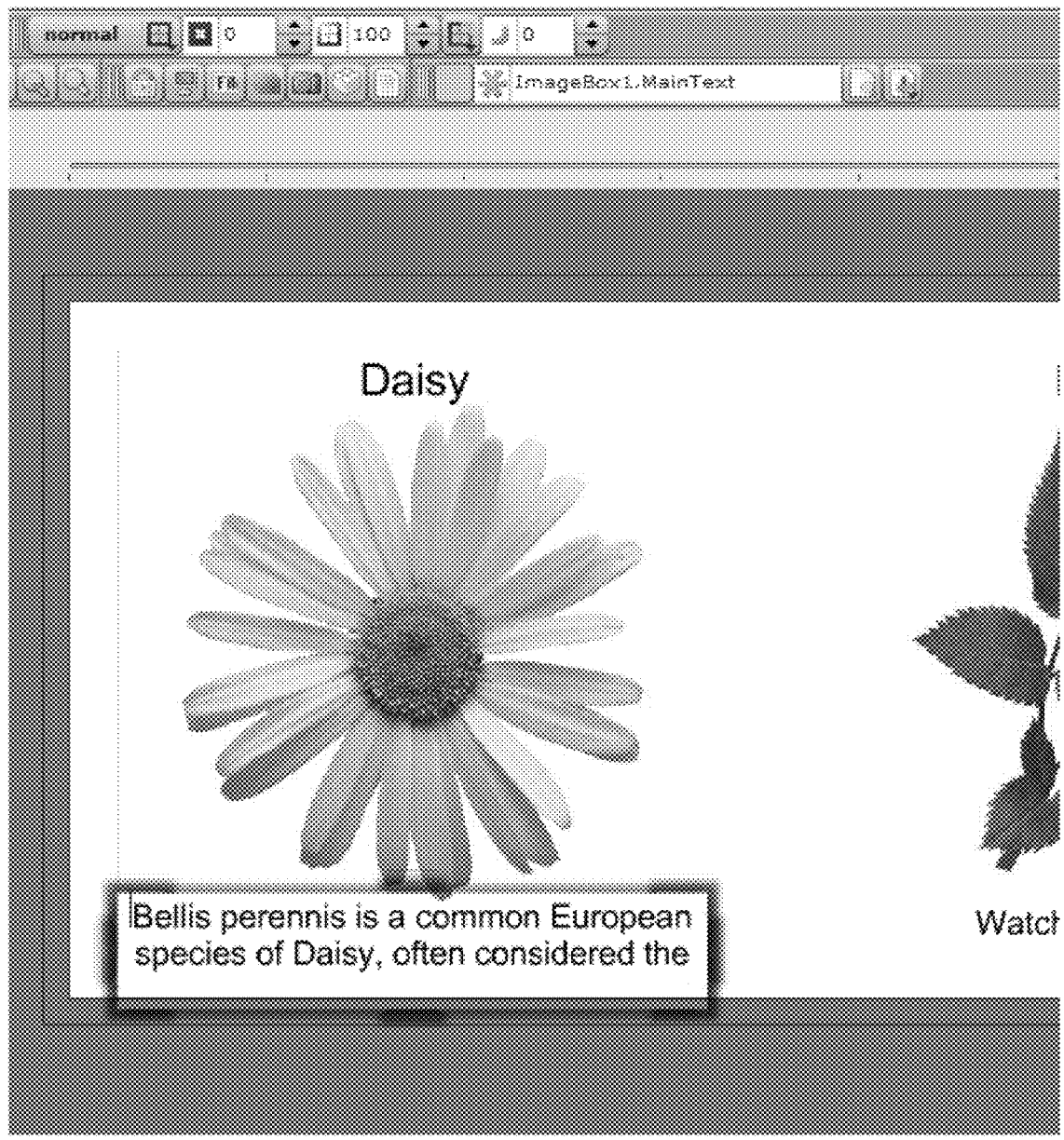
Figure 17:
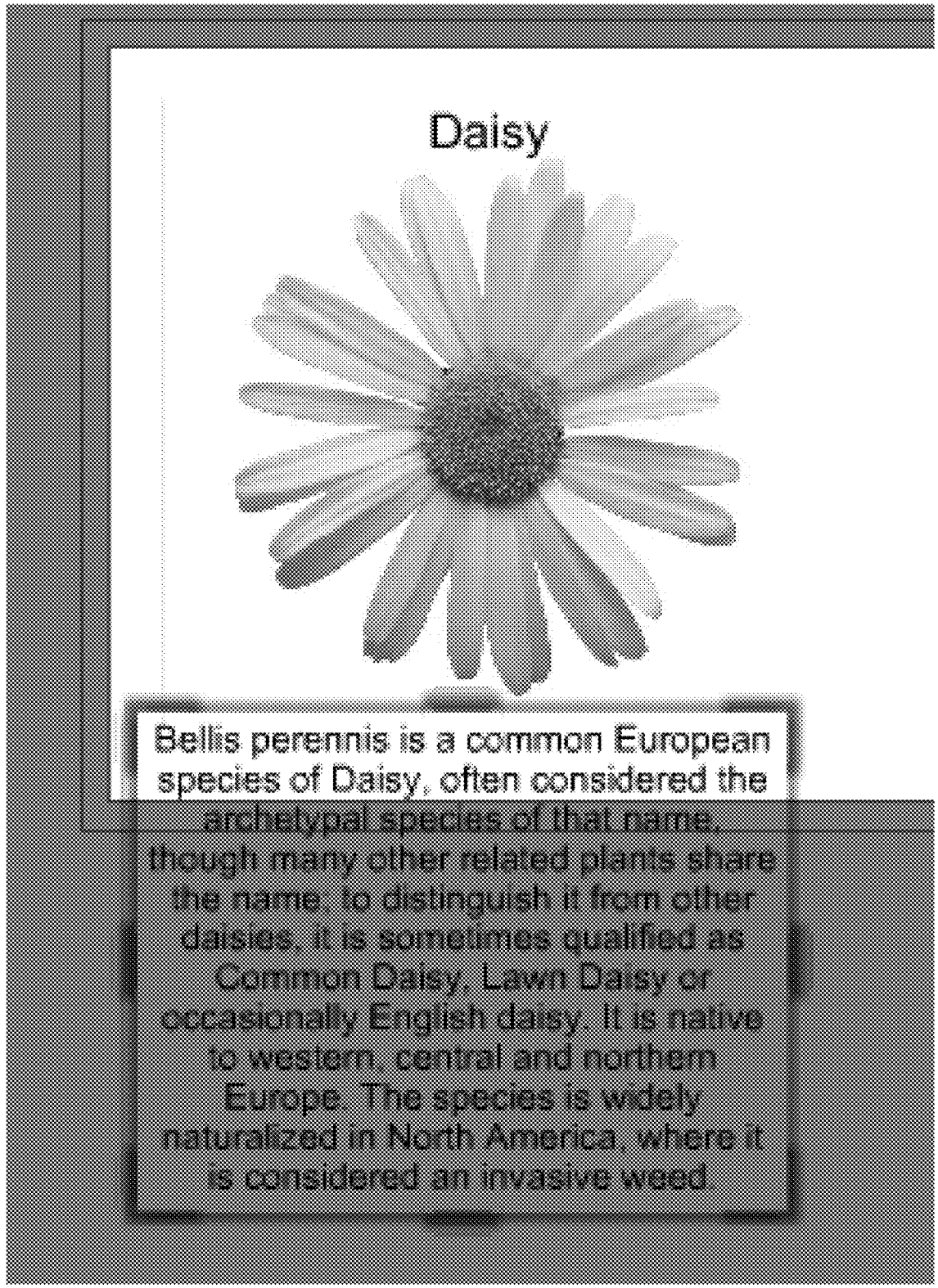

FIGS. 15-17 show how a variable field in a text box can be associated with a different property of an Image Box. FIG. 15 shows a text box with the entirety of its only variable field identified and selected. In FIG. 16 the variable assigned to the variable field of the text box is changed from "Disclaimer" to "MainText", and the text in the associated textbox changed accordingly. FIG. 17 shows the text box expanded to show all of the imported text.

FIGS. 18-23 show how to set up and edit a new document or template in accordance with this embodiment.

Figure 18:

FIG. 18 shows a new blank document.

Figure 19:
Figure 20:
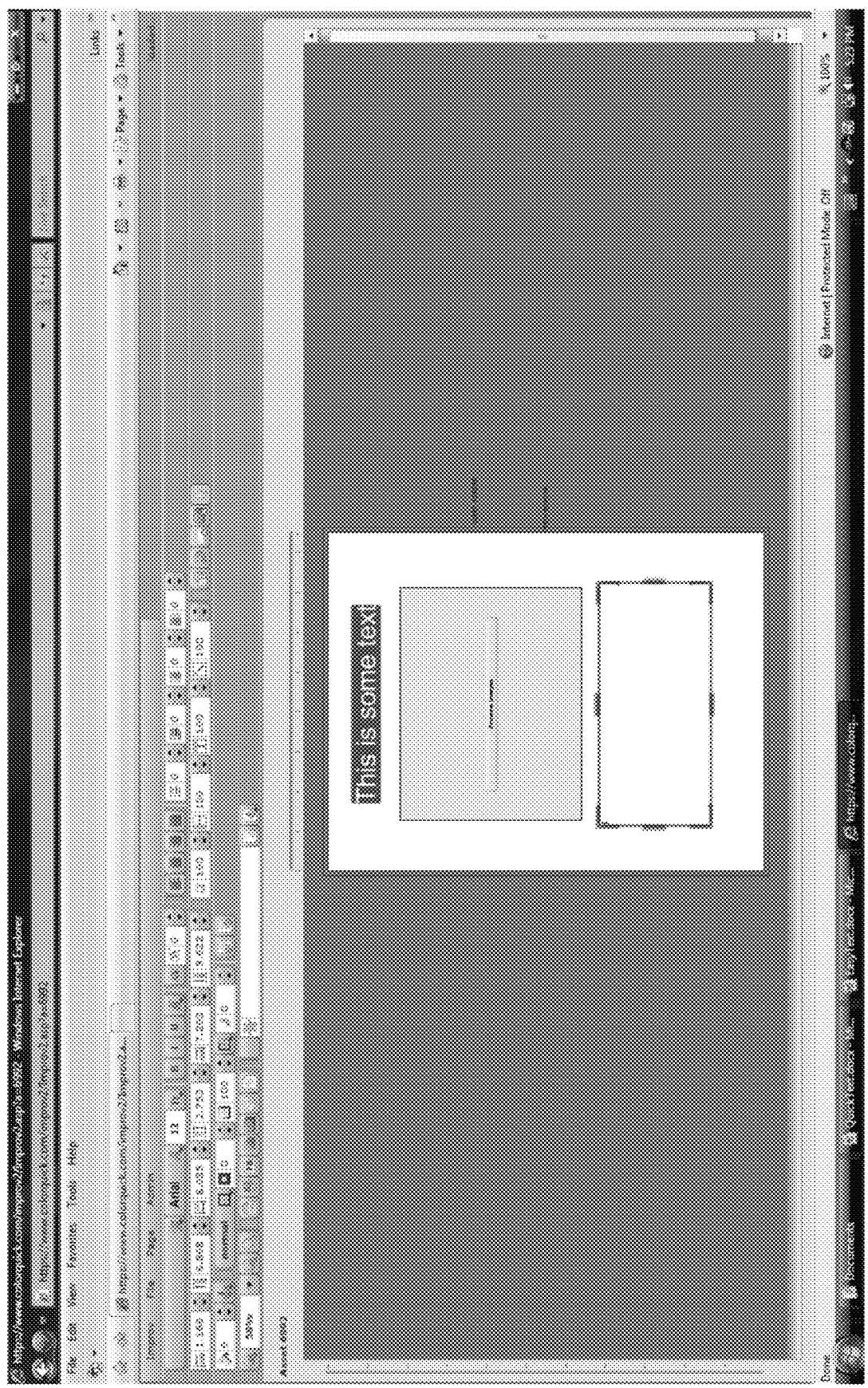

This is what the web site loads when an authorized user clicks on the "Create a new Template" button from FIG. 6. FIG. 19 shows a new Text Box being drawn. FIG. 20 shows a second text box, and also shows that an image box has been added to the document. These were added in a similar manner as the text box in FIG. 19. The text that was typed into the first text box has also been selected.

Figure 21:
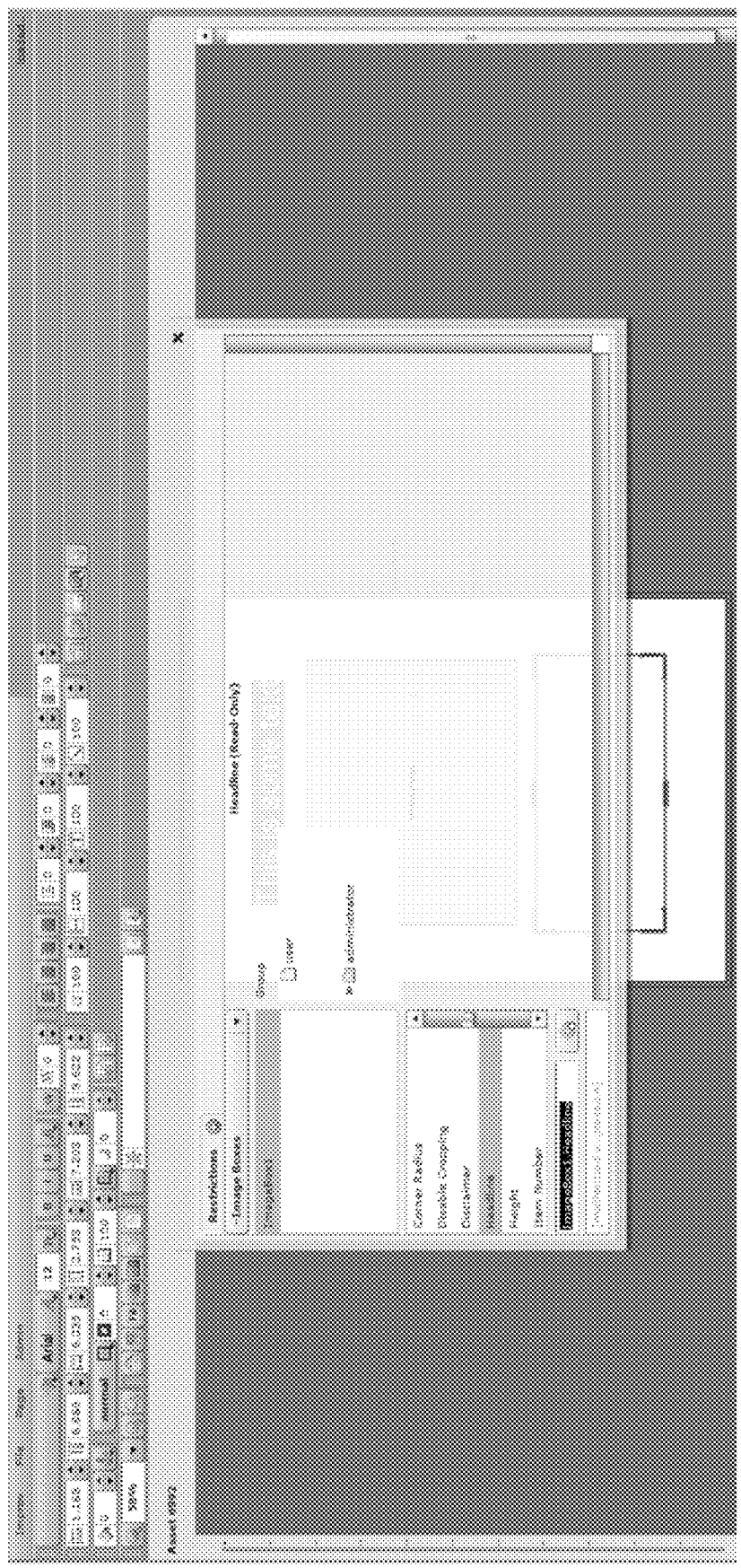

FIG. 21 shows an open restrictions panel. This can be used to identify available properties of created objects. By cutting and pasting, or by typing, a variable is assigned to the selected text (Selection made in FIG. 20) in the same manner as a variable was assigned in FIG. 16. In this case, the Imagebox1.Headline was assigned to a new variable field in the first (top) text box, while Imagebox1.MainText was assigned to a new variable field in the second (lower) text box.

Figure 22:
Figure 23:
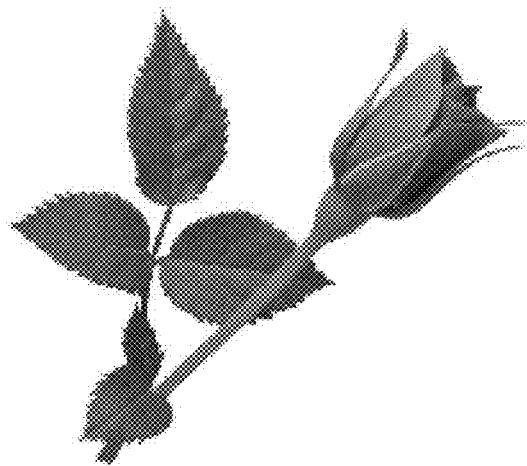

FIG. 22 shows the result of that assignment after the daisy image has been placed in the image box. FIG. 23 shows the result after the pink rose image was placed in the image box.

Figure 26:
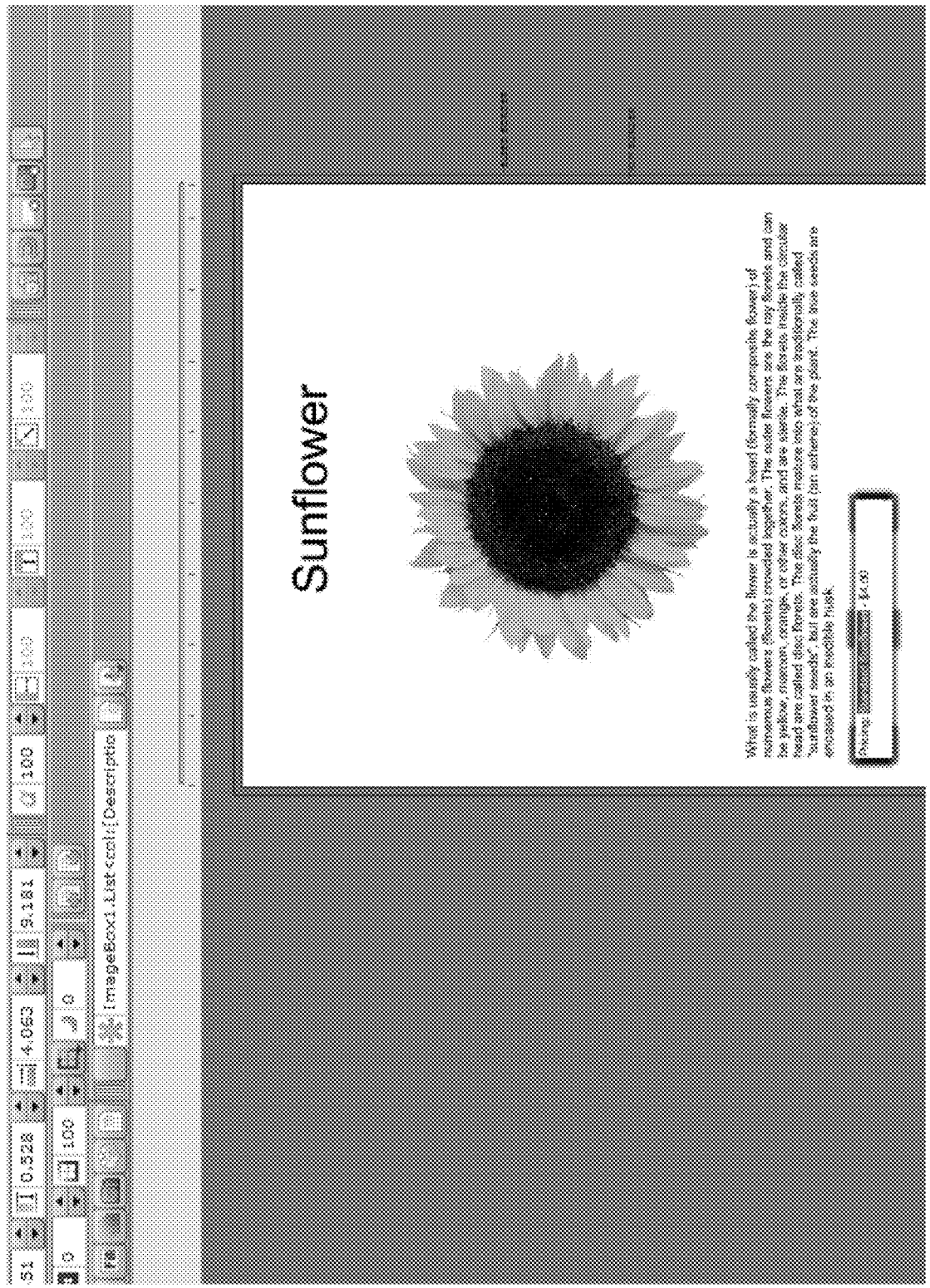

FIGS. 24-26 show how associated data can be referenced indirectly. FIG. 24 shows another configuration of the page to associate data with an asset. In FIG. 24, the "List" property of the associated data is associated with a list that is depicted in FIG. 25. FIG. 26 shows a document with a selected text box. In the text box, the highlighted text is associated with the first "Description" from the list that is referenced in the "List" property of the associated data. The exact reference to the value in the list is "ImageBox1.List<col:[Description]><abs: 0>" meaning that the application retrieves the first row (abs stands for absolute and the rows are 0-indexed) and the column (col) "Description" from the List associated with the image contained in ImageBox1.

In one preferred embodiment, the populated text in the text box is treated as a locked text field which the user may not edit. In an alternative embodiment, the populated text in a text box can be editable by the user, depending on the security settings. In either case, the populated text did not have to be typed by the user when composing this document.

Figure 27:
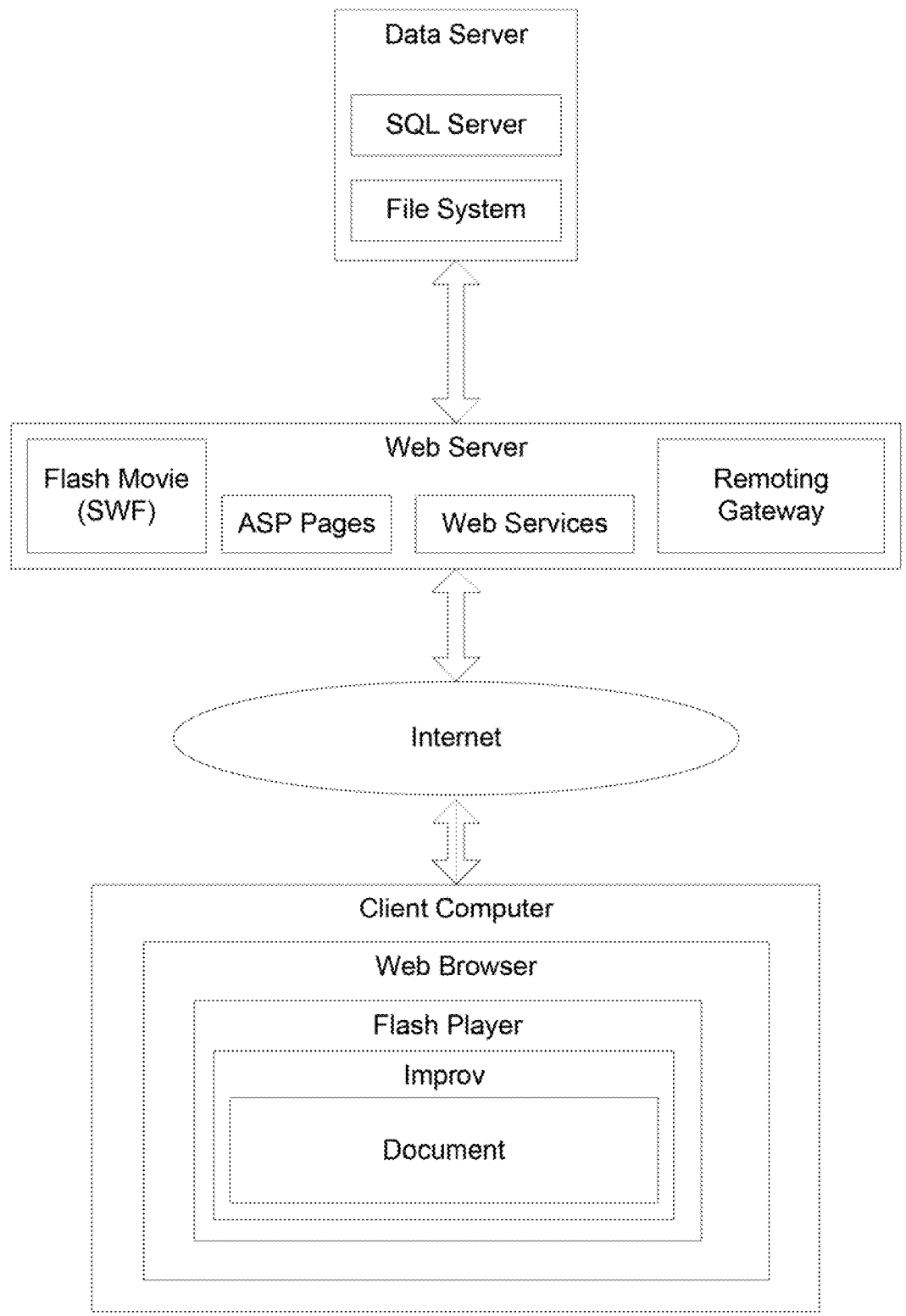
FIG. 27 is a schematic diagram of a hardware configuration in accordance with one preferred embodiment of the present invention.

FIG. 27 shows a self-explanatory hardware configuration for one preferred embodiment of the present invention.

Included in the Appendix is sample source code from the client application shown in FIGS. 8-23 and 26, and server-side code that interacts with the aforementioned client application. The following information is provided to assist in an understanding of the sample source code:

a) The client-side application is a document composition application created with the Adobe® Flex® 2.0.1 framework and compiler. The server side code was implemented using ASP.NET and Weborb 3.3.

b) Calls to server-side methods retrieve assets (e.g., images, data lists, templates) which are identified by an integer id. Asset collections (list of images), which is a list of all available assets of a given type, may also be retrieved. Lastly, documents may be received as templates identified by an integer, or job pages identified by a pair of integers.

c) Multiple files are included in the Appendix. Start of files are marked with "FILE START:" followed by the relative file path. The end of files are marked with "FILE END:" followed by the relative file path. These start and end lines are not part of compilable code. XML and XML list snippets are headed by appropriate comments. The syntax of the source code identifies what language the code is written in and thus how the code may be compiled and executed. For further detail, ".as" and ".mxml" files are client-side Adobe Flex files and ".cs" files are c# files server-side files.

d) The following additional information is provided to assist in the compiling of the client side code provided in the Appendix:

i) Files in the mx.graphics packages and its sub-packages are not included in the Appendix. However, these files are only used to create graphical previews of objects and documents, and thus are not required for implementing the present invention.

ii) The class "OpenNumericStepper" was omitted from the Appendix. This class is a derivative of the class NumericStepper from the Flex 2.0.1 framework. To recreate this class, the non-public properties and methods are changed to public properties and methods.

iii) Artwork to be embedded in the application (e.g., icons) is not included. When compiling the code, replacement artwork should be provided as necessary.

iv) Font files are not included. This application uses "embedded fonts" loaded from external Adobe Flash® files, but could be modified to use "device fonts" without changing the material functionality of the application.

v) The uri of some locations have been redacted. The vast majority of the functionality at these locations is irrelevant to the functioning of this source code and can be ignored or coded around. Material functionality located at these locations is explicitly addressed below.

e) The following is a discussion of the relevant server-side code:

i) The asp pages, referenced in the code as "imageDownloadPage" and "DAMThumbnailImagePage", are passed an asset number for an asset of type image. These pages return the asset image or thumbnail of the asset image, respectively.

ii) Sample remoting code using WebORB is provided, including the List Provider MailingListProvider. MailingListProvider is included in the Appendix as a representative example of other List Providers that allow for the retrieval of list assets from the server to the client. The data serialization is the standard serialization done by WebORB.

iii) The web service method "getImage" returns data for the image with the id that was passed to the method. An example of this data format is included in the Appendix.

iv) The web service method "getDAMImages" returns a list of data for all image assets in the form of a list of xml. An example of this data format is included in the Appendix.

v) The web service method "getDocument" is passed a template id, a job id and a page id. If the template id is not 0, then the template with that id is returned. Otherwise, the page of the job of the respectively passed ids is returned. In either event, a document is returned in xml format. An example document is included in the Appendix.

vi) The web service method "saveDocument" is passed a document in xml format and an id. The document format is the same as the document format referred to in section v. A Boolean value and preview image are also passed, as seen in the client-side code in the Appendix. These items are not relevant to the functionality of the preferred embodiments and thus are not further discussed. If the document is a template, the template id is passed as the id. Otherwise, the job number and the page number separated by a comma is passed.

vii) Any GUIDs passed to a web method, as seen in the client-side code in the Appendix, are not relevant to the functionality of the preferred embodiments and thus are not further discussed.

The text boxes and image boxes described above are graphical objects. Other types of graphical objects, such as video and interactive content, are within the scope of the present invention. For example, instead of dragging and dropping an image into an image box, video (i.e., a first graphical object) may be dragged and dropped into a video box that has conventional video control buttons. A second graphical object, which may be text, video or interactive content, would then be processed in the same manner as described above with respect to text boxes.

In another preferred embodiment, the first graphical object and the second graphical object are the same graphical object.

One preferred embodiment of the present invention is implemented via the source code in the accompanying Appendix. However, the scope of the present invention is not limited to this particular implementation of the invention.

Figures include icons created by Mark James from "http://WorldWideWeb.famfamfam.com/lab/silk/" licensed under the Creative Commons Attribution 2.5 License.

FIGS. 5A, 16, 17, 22-24, 26 include excerpts licensed under the GNU Free Documentation License (http://WorldWideWeb.gnu.org/copyleft/fdl.html) from: http://en.wikipedia.org/wiki/Bellis_perennis, http://en.wikipedia.org/wiki/Sunflower, and http://en.wikipedia.org/wiki/Rose.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

While the present invention has been particularly shown and described with reference to one preferred embodiment thereof, it will be understood by those skilled in the art that various alterations in form and detail may be made therein without departing from the spirit and scope of the present invention.

What is claimed is:

1. An automated method of preparing a document for editing, the document including (i) a first graphical object having a plurality of properties stored therein, and
   (ii) a second graphical object having at least one variable field or property stored therein, the method comprising:
   (a) providing a user interface display screen that allows a user to design a document that includes a plurality of graphical objects;
   (b) creating the document on the user interface display screen;
   (c) adding the first graphical object and the second graphical object to the document;
   (d) the user identifying at least one variable field or property stored in the second graphical object which is a variable field or property other than the name, or filename, or identification of the second graphical object; and
   (e) defining a mapping between the identified variable field or property stored in the second graphical object and a property of the first graphical object stored therein, wherein the property of the first graphical object is a property other than the name property, or filename property, or identification property of the first graphical object, and wherein a document is prepared for editing by performing steps (a)-(e).

2. The method of claim 1 wherein the editing is versioning.

3. The method of claim 1 further comprising:
   (f) saving the document for subsequent use as a document or a document template.

4. The method of claim 1 further comprising:
   (f) selecting a digital asset via the user interface display screen;
   (g) linking the digital asset to the first graphical object;
   (h) populating the first graphical object with the digital asset;
   (i) populating properties of the first graphical object with editable related data of the digital asset; and
   (j) automatically setting the at least one variable field or property stored in the second graphical object using the value of the associated property from the first graphical object.

5. The method of claim 1 wherein the first graphical object is an image box or a text box.

6. The method of claim 1 wherein the second graphical object is an image box or a text box.

7. The method of claim 1 wherein the first graphical object and the second graphical object are the same graphical object.

8. An automated method of editing a document, the document including
   (i) a first graphical object having a plurality of properties stored therein, and (ii) a second graphical object having at least one user-selected variable field or property stored therein that is mapped to a property of the first graphical object stored therein, wherein the property of the first graphical object is a property other than the name property, or filename property, or identification property of the first graphical object, and wherein the at least one user-selected variable field or property of the second graphical object is a variable field or property other than the name, or filename, or identification of the second graphical object, the document being created using a library of digital assets, each of the digital assets including editable related data, the method comprising:
   (a) providing the document in a document composition environment;
   (b) selecting a digital asset from the library via a user interface display screen;

(c) linking the digital asset to the first graphical object;
(d) populating the first graphical object with the digital asset;
(e) populating properties of the first graphical object with editable related data of the digital asset; and
(f) automatically setting the value of at least one user-selected variable field or property of the second graphical object by using its mapped property to the first graphical object, wherein the document is edited as a result of performing steps (a)-(f).

9. The method of claim 8 wherein step (a) is performed by selecting a document template from a set of previously defined document templates.

10. The method of claim 8 wherein step (a) is performed by selecting a document from a set of previously defined documents.

11. The method of claim 8 wherein the first graphical object is an image box or a text box.

12. The method of claim 8 wherein the second graphical object is an image box or a text box.

13. The method of claim 8 wherein the first graphical object and the second graphical object are the same graphical object.

14. The method of claim 1 wherein the mapping is a direct object to object mapping.

15. The method of claim 8 wherein the mapping is a direct object to object mapping.

16. The method of claim 1 wherein a first set of computer code defines only the first graphical object and a second set of computer code defines only the second graphical object, the first set of computer code being distinct from the second set of computer code.

17. The method of claim 8 wherein a first set of computer code defines only the first graphical object and a second set of computer code defines only the second graphical object, the first set of computer code being distinct from the second set of computer code.

* * * * *